United States Patent
Lubbers et al.

(10) Patent No.: US 7,444,541 B2
(45) Date of Patent: Oct. 28, 2008

(54) FAILOVER AND FAILBACK OF WRITE CACHE DATA IN DUAL ACTIVE CONTROLLERS

(75) Inventors: Clark E. Lubbers, Colorado Springs, CO (US); Michael D. Walker, Colorado Springs, CO (US); Susan G. Elkington, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 11/479,846

(22) Filed: Jun. 30, 2006

(65) Prior Publication Data

US 2008/0005614 A1  Jan. 3, 2008

(51) Int. Cl.
*G06F 11/00* (2006.01)
(52) U.S. Cl. .......................................... 714/5
(58) Field of Classification Search ............ 714/6, 714/11, 5; 711/135
See application file for complete search history.

(56) References Cited

U.S. PATENT DOCUMENTS

| | | | |
|---|---|---|---|
| 5,790,775 A * | 8/1998 | Marks et al. | 714/9 |
| 6,006,342 A * | 12/1999 | Beardsley et al. | 714/5 |
| 6,513,097 B1 * | 1/2003 | Beardsley et al. | 711/113 |
| 6,574,709 B1 | 6/2003 | Skazinski et al. | |
| 6,578,158 B1 | 6/2003 | Deitz et al. | |
| 6,587,921 B2 * | 7/2003 | Chiu et al. | 711/119 |
| 6,629,264 B1 | 9/2003 | Sicola et al. | |
| 6,643,795 B1 | 11/2003 | Sicola et al. | |
| 6,658,590 B1 | 12/2003 | Sicola et al. | |
| 6,681,339 B2 * | 1/2004 | McKean et al. | 714/5 |
| 6,704,839 B2 | 3/2004 | Butterworth et al. | |
| 6,912,669 B2 * | 6/2005 | Hauck et al. | 714/6 |
| 6,931,487 B2 | 8/2005 | Lubbers et al. | |
| 6,993,610 B2 | 1/2006 | Coffey et al. | |
| 6,996,690 B2 | 2/2006 | Nakamura et al. | |
| 7,051,121 B2 | 5/2006 | Ohno et al. | |
| 7,055,057 B2 | 5/2006 | Achiwa | |
| 7,058,848 B2 | 6/2006 | Sicola et al. | |
| 2004/0078632 A1 | 4/2004 | Infante et al. | |
| 2004/0255181 A1 * | 12/2004 | Hsu et al. | 714/2 |

\* cited by examiner

*Primary Examiner*—Robert Beausoliel
*Assistant Examiner*—Amine Riad
(74) *Attorney, Agent, or Firm*—Fellers, Snider, et al.

(57) ABSTRACT

A data storage system is provided with a pair of controllers and circuitry configured for failing back from a single active write back mode to a dual active write back mode by copying cached data directly from a cache of a survivor controller of the pair of controllers to a cache of the other controller. A method is provided for failing over from a dual active mode of first and second controllers to a single active mode of the first controller by relying on previously mirrored cache data by the second controller; reinitializing the second controller; and failing back to the dual active mode by copying cached data directly from the first controller to the second controller.

19 Claims, 8 Drawing Sheets

FAILOVER AND FAILBACK OF WRITE CACHE DATA IN DUAL ACTIVE CONTROLLERS

FIELD OF THE INVENTION

The claimed invention relates generally to the field of distributed storage systems and more particularly, but not by way of limitation, to an apparatus and method for failing over and failing back with dual active controllers passing access commands between a remote device and a storage space.

BACKGROUND

Storage devices are used to access data in a fast and efficient manner. Some types of storage devices use rotatable storage media, along with one or more data transducers that write data to and subsequently read data from tracks defined on the media surfaces.

Intelligent storage elements (ISEs) can employ multiple storage devices to form a consolidated memory space. One commonly employed format for an ISE utilizes a RAID (redundant array of independent discs) configuration, wherein input data are stored across multiple storage devices in the array. Depending on the RAID level, various techniques including mirroring, striping and parity code generation can be employed to enhance the integrity of the stored data.

With continued demands for ever increased levels of storage capacity and performance, there remains an ongoing need for improvements in the manner in which storage devices in such arrays are operationally managed. It is to these and other improvements that preferred embodiments of the present invention are generally directed.

SUMMARY OF THE INVENTION

Preferred embodiments of the present invention are generally directed to an apparatus and associated method for failing over and failing back dual controllers in a distributed storage system.

In some embodiments a data storage system is provided with a pair of controllers and circuitry configured for failing back from a single active write back mode to a dual active write back mode by copying cached data directly from a cache of a survivor controller of the pair of controllers to a cache of the other controller.

In some embodiments a method is provided for failing over from a dual active mode of first and second controllers to a single active mode of the first controller by relying on previously mirrored cache data by the second controller; reinitializing the second controller; and failing back to the dual active mode by copying cached data directly from the first controller to the second controller.

In some embodiments a data storage system is provided having first and second controllers with respective write back caches for passing write commands to a storage space, and means for failing over and failing back to operate the controllers in single active and dual active modes, respectively.

These and various other features and advantages which characterize the claimed invention will become apparent upon reading the following detailed description and upon reviewing the associated drawings.

DETAILED DESCRIPTION

Figure 1:
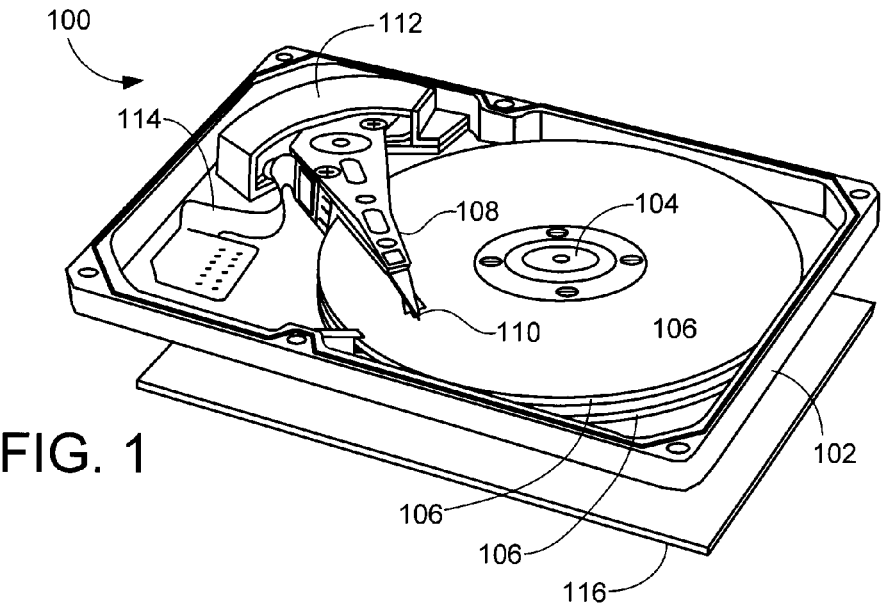
FIG. 1 generally illustrates a storage device constructed and operated in accordance with preferred embodiments of the present invention.

FIG. 1 shows an exemplary storage device 100 configured to store and retrieve user data. The device 100 is preferably characterized as a hard disc drive, although other device configurations can be readily employed as desired.

A base deck 102 mates with a top cover (not shown) to form an enclosed housing. A spindle motor 104 is mounted within the housing to controllably rotate media 106, preferably characterized as magnetic recording discs.

A controllably moveable actuator 108 moves an array of read/write transducers 110 adjacent tracks defined on the media surfaces through application of current to a voice coil motor (VCM) 112. A flex circuit assembly 114 provides electrical communication paths between the actuator 108 and device control electronics on an externally mounted printed circuit board (PCB) 116.

Figure 2:
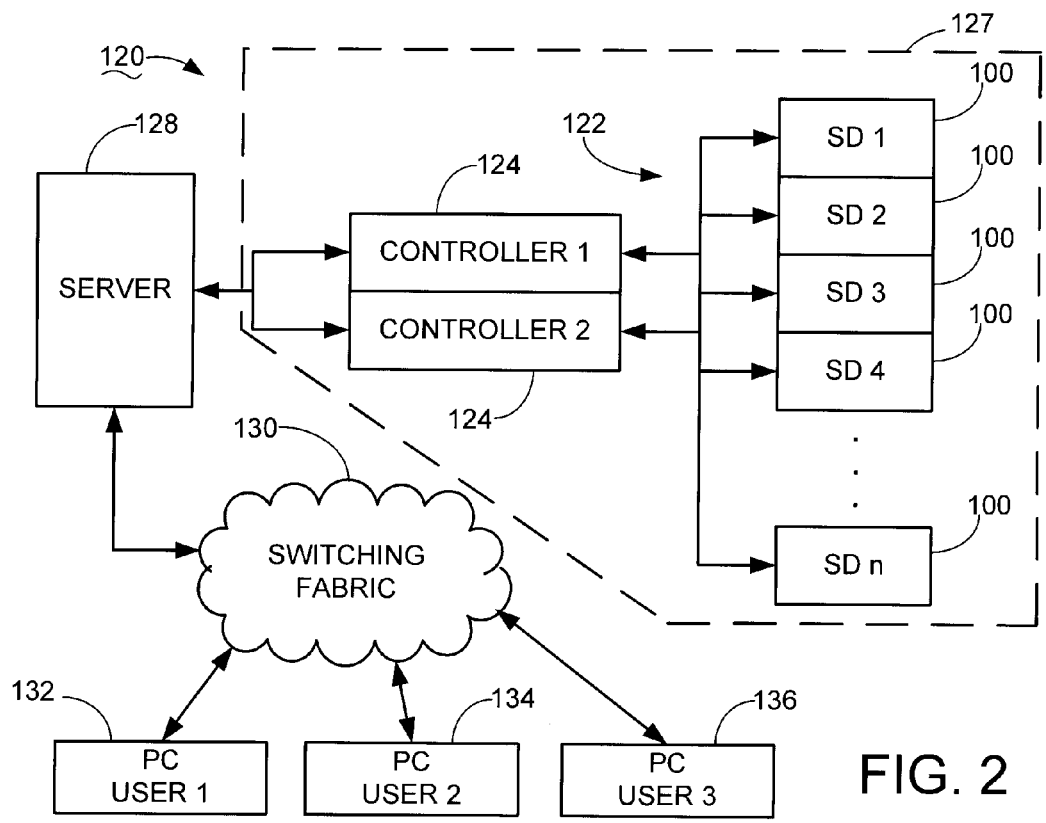
FIG. 2 is a functional block diagram of a network system which utilizes a number of storage devices such as illustrated in FIG. 1.

FIG. 2 generally illustrates an exemplary network system 120 that advantageously incorporates a number n of the storage devices (SD) 100 to form a consolidated storage space 122. Redundant controllers 124 preferably operate to transfer data between the storage space 122 and a server 128 (host). The server 128 in turn is connected to a switching fabric 130, such as a local area network (LAN), the Internet, etc.

Remote users respectively access the fabric 130 via personal computers (PCs) 132, 134, 136. In this way, a selected user can access the storage space 122 to write or retrieve data as desired.

The devices 100 and the controllers 124 are preferably incorporated into an intelligent storage element (ISE) 127. The ISE 127 preferably uses one or more selected RAID (redundant array of independent discs) configurations to store data across the devices 100. Although only one ISE 127 and three remote users are illustrated in FIG. 2, it will be appreciated that this is merely for purposes of illustration and is not limiting; as desired, the network system 120 can utilize any number and types of ISEs, servers, client and host devices, fabric configurations and protocols, etc.

Figure 3:
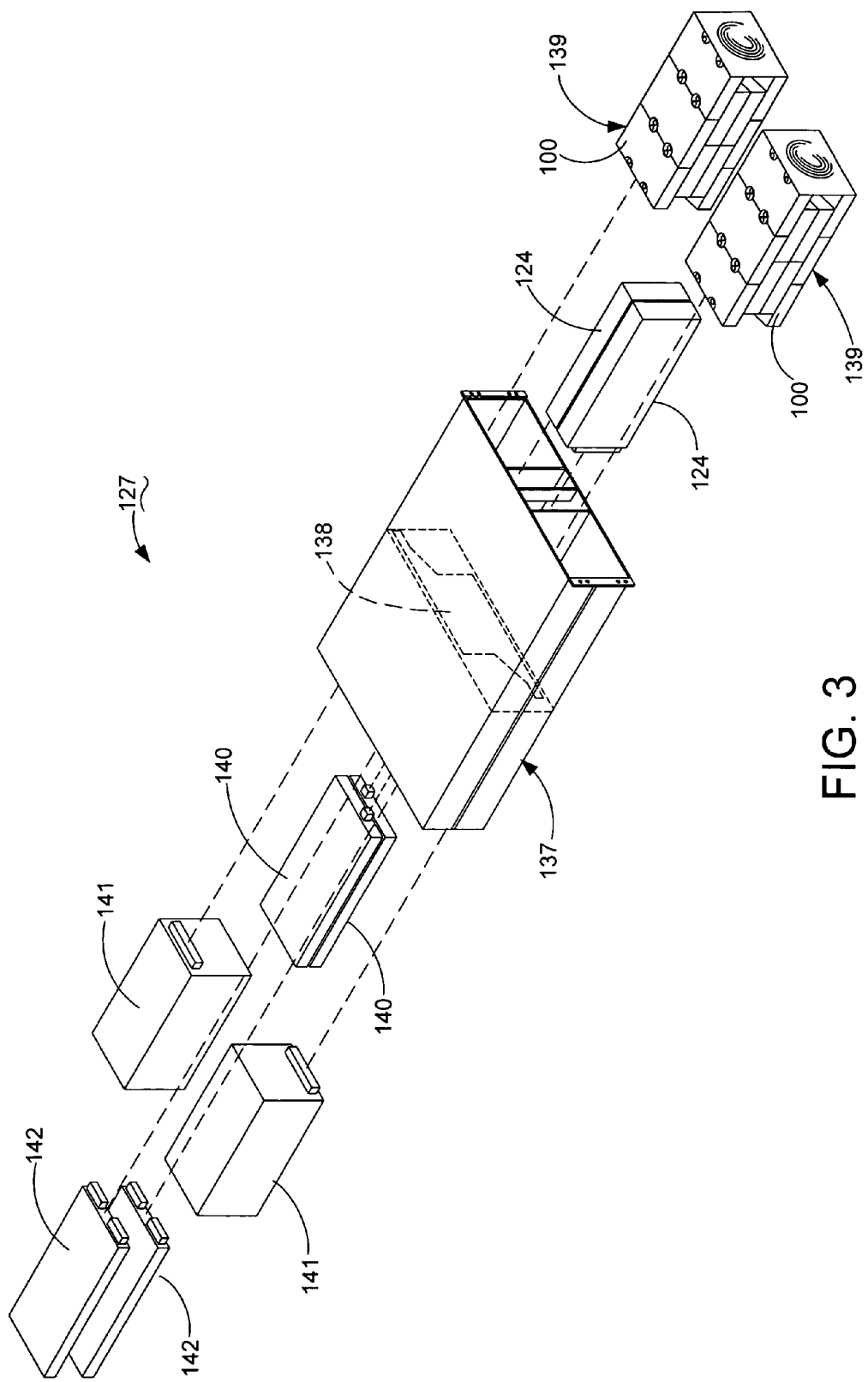
FIG. 3 is an exploded perspective view of an intelligent storage element constructed in accordance with embodiments of the present invention.

FIG. 3 illustrates hardware in an ISE 127 constructed in accordance with embodiments of the present invention. A shelf 137 defines cavities for receivingly engaging the controllers 124 in electrical connection with a midplane 138. The shelf 137 is supported, in turn, within a cabinet (not shown). A pair of multiple disc assemblies (MDAs) 139 is receivingly engageable with the shelf 137 on the same side of the midplane 138. Connected to the opposing side of the midplane 138 are dual batteries 140 providing an emergency power supply, dual alternating current power supplies 141, and dual interface modules 142. Preferably, the dual components are configured for operating either of the MDAs 139 or both simultaneously, thereby providing backup protection in the event of a component failure.

Figure 4:
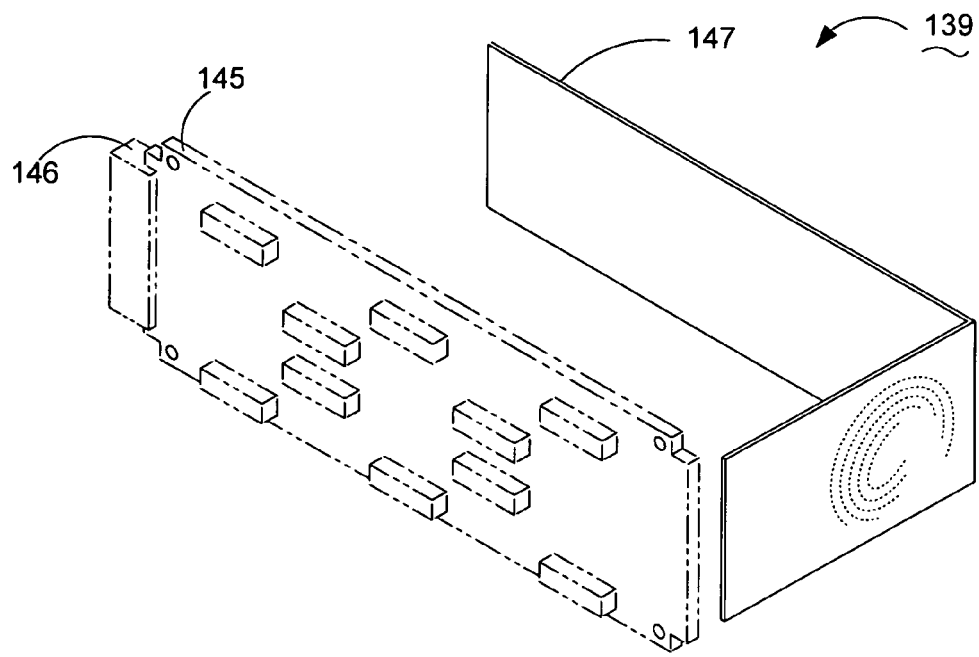
FIG. 4 is a partially exploded perspective view of a multiple disc array of the intelligent storage element of FIG. 3.
Figure 4:
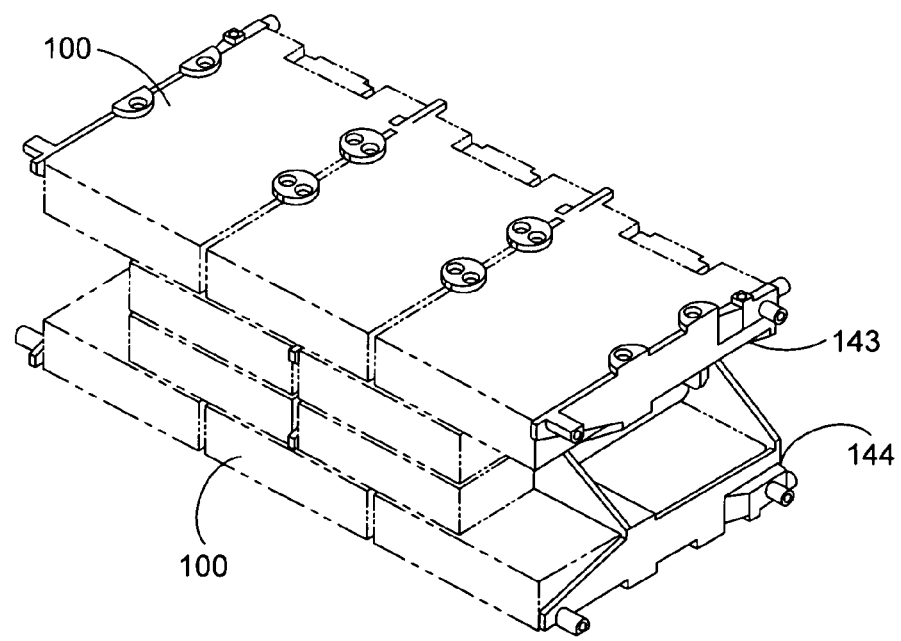

FIG. 4 is an enlarged partially exploded isometric view of an MDA 139 constructed in accordance with some embodiments of the present invention. The MDA 139 has an upper partition 143 and a lower partition 144, each supporting five data storage devices 100. The partitions 143, 144 align the data storage devices 100 for connection with a common circuit board 145 having a connector 146 that operably engages the midplane 138 (FIG. 3). A wrapper 147 provides electromagnetic interference shielding. This illustrative embodiment of the MDA 139 is the subject matter of patent application Ser. No. 10/884,605 entitled Carrier Device and Method for a Multiple Disc Array which is assigned to the assignee of the present invention and incorporated herein by reference. Another illustrative embodiment of the MDA 139 is the subject matter of patent application Ser. No. 10/817,378 of the same title which is also assigned to the assignee of the present invention and incorporated herein by reference. In alternative equivalent embodiments the MDA 139 can be provided within a sealed enclosure.

Figure 5:
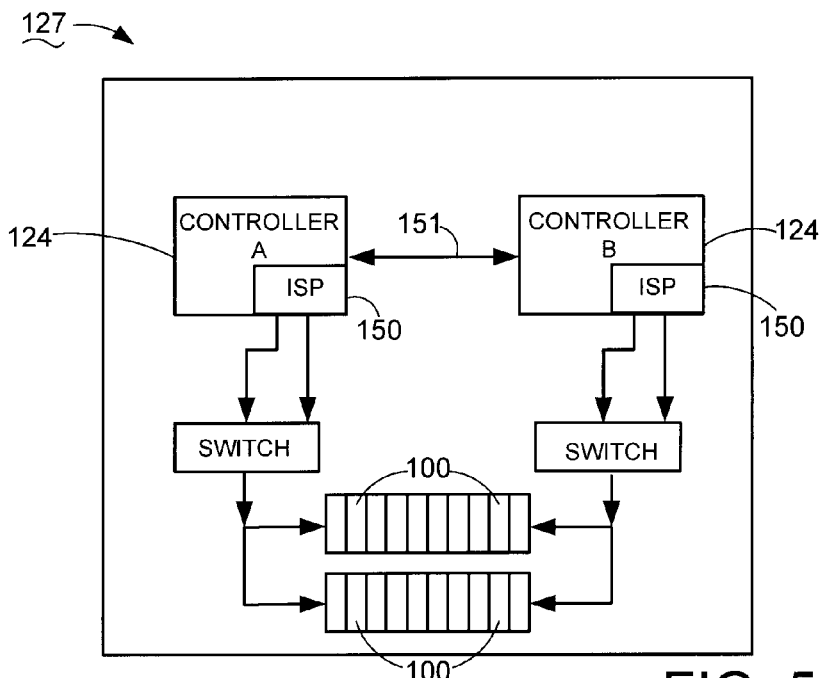
FIG. 5 is a functional block diagram of the intelligent storage element of FIG. 3.

FIG. 5 is a diagrammatic depiction of an illustrative ISE 127 constructed in accordance with embodiments of the present invention. The controllers 124 operate in conjunction with intelligent storage processors (ISPs) 150 to provide managed reliability of the data integrity. The ISPs 150 can be resident in the controller 124, in the MDA 139, or elsewhere within the ISE 127.

Aspects of the managed reliability include invoking reliable data storage formats such as RAID strategies. For example, by providing a system for selectively employing a selected one of a plurality of different RAID formats creates a relatively more robust system for storing data, and permits optimization of firmware algorithms that reduce the complexity of software used to manage the MDA 139, as well as resulting in relatively quicker recovery from storage fault conditions. These and other aspects of this multiple RAID format system are described in patent application Ser. No. 10/817,264 entitled Storage Media Data Structure and Method which is assigned to the present assignee and incorporated herein by reference.

Managed reliability can also include scheduling of diagnostic and correction routines based on a monitored usage of the system. Data recovery operations are executed for copying and reconstructing data. The ISP 150 is integrated with the MDAs 139 in such as way to facilitate "self-healing" of the overall data storage capacity without data loss. These and other aspects of the managed reliability aspects contemplated herein are disclosed in patent application Ser. No. 10/817,617 entitled Managed Reliability Storage System and Method which is assigned to the present assignee and incorporated herein by reference. Other aspects of the managed reliability include responsiveness to predictive failure indications in relation to predetermined rules, as disclosed for example in patent application Ser. No. 11/040,410 entitled Deterministic Preventive Recovery From a Predicted Failure in a Distributed Storage System which is assigned to the present assignee and incorporated herein by reference.

In further accordance with these managed reliability objectives, the present embodiments contemplate operating in a "dual active" mode whereby data that is transferred to cache by one controller is mirrored to cache associated with another controller. Preferably, this mirroring is performed passively; that is, the mirroring is performed absent any host control. Passive mirroring is the subject matter of a co-pending application entitled Passive Mirroring Through Concurrent Transfer of Data to Multiple Target Devices, which is assigned to the assignee of the present invention and incorporated by reference herein.

When both controllers 124 are operably available the mirroring of cache data is enabled. Upon failover to only one controller 124 the mirroring is disabled. However, upon return of the failed controller 124 to service, mirroring can be re-enabled. This is described more fully below, beginning with a description of the ISE 127 that makes passive mirroring feasible.

Figure 6:
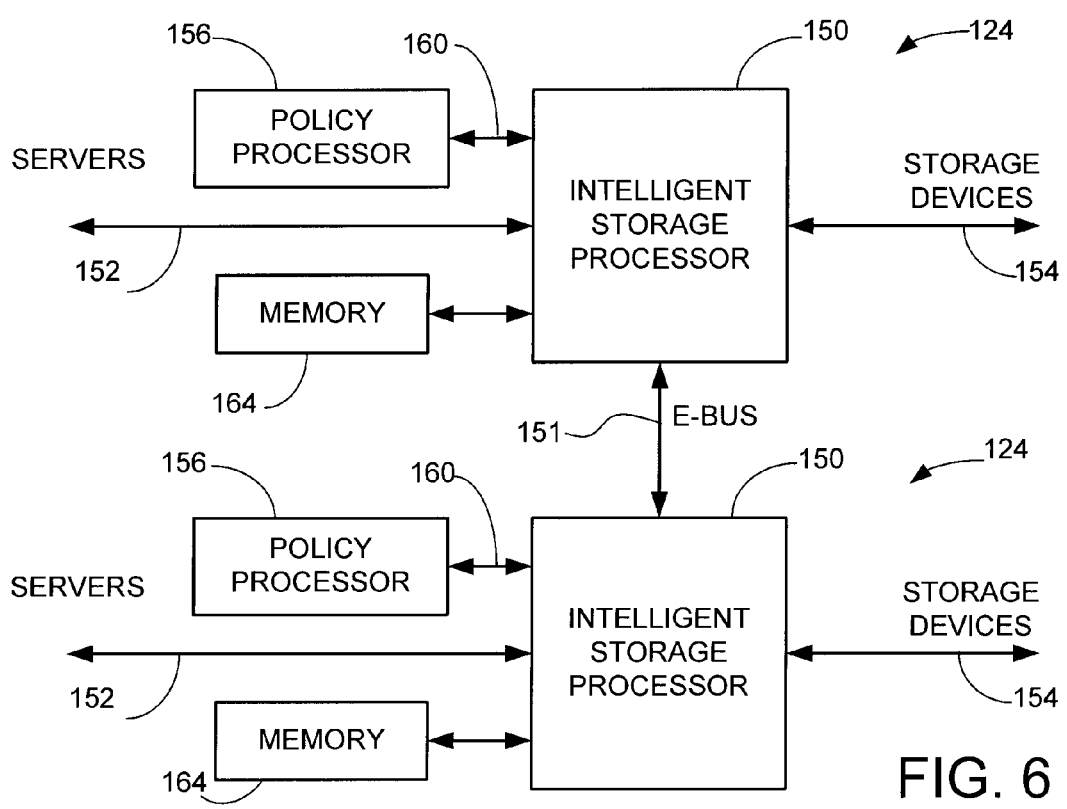
FIG. 6 provides a general representation of a preferred architecture of the controllers of FIG. 2.

FIG. 6 sets forth the two intelligent storage processors (ISPs) 150 coupled by an intermediate bus 151 (referred to as an "E BUS"). Each of the ISPs 150 is preferably disposed in a separate integrated circuit package on a common controller board. Preferably, the ISPs 150 each respectively communicate with upstream application servers via fibre channel server links 152, and with the storage devices 100 via fibre channel storage links 154.

Policy processors 156 execute a real-time operating system (RTOS) for the controller 124 and communicate with the respective ISPs 150 via PCI busses 160. The policy processors 156 can further execute customized logic to perform sophisticated processing tasks in conjunction with the ISPs 150 for a given storage application. The ISPs 150 and the policy processors 156 access memory modules 164 as required during operation.

Figure 7:
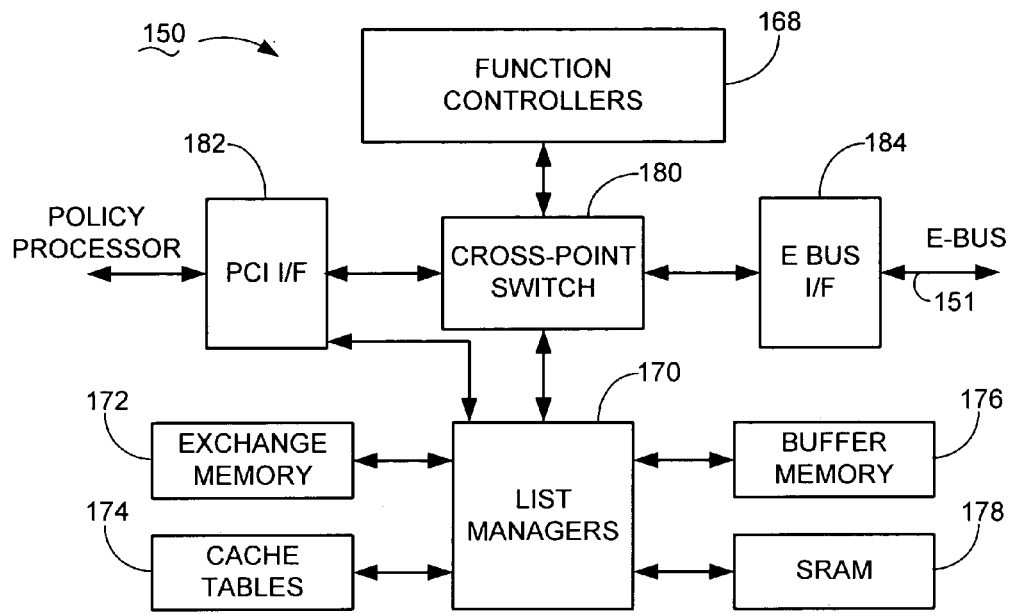
FIG. 7 provides a functional block diagram of a selected intelligent storage processor of FIG. 6.

FIG. 7 provides a preferred construction for a selected ISP 150 of FIG. 6. A number of function controllers, collectively identified at 168, serve as function controller cores (FCCs) for a number of controller operations such as host exchange, direct memory access (DMA), exclusive-or (XOR), command routing, metadata control, and disc exchange. Each FCC preferably contains a highly flexible feature set and interface to facilitate memory exchanges and other scheduling tasks.

The list managers 170 preferably generate and update scatter-gather lists (SGL) during array operation. As will be recognized, an SGL generally identifies memory locations to which data are to be written ("scattered") or from which data are to be read ("gathered").

Each list manager 170 preferably operates as a message processor for memory access by the FCCs 168, and preferably executes operations defined by received messages in accordance with a defined protocol.

The list managers 170 respectively communicate with and control a number of memory modules including an exchange memory block 172, a cache tables block 174, buffer memory block 176, PCI interface 182 and SRAM 178. The function controllers 168 and the list managers 170 respectively communicate via a cross-point switch (CPS) module 180. In this way, a selected function core of controllers 168 can establish a communication pathway through the CPS 180 to a corresponding list manager 170 to communicate a status, access a memory module, or invoke a desired ISP 150 operation.

Similarly, a selected list manager 170 can communicate responses back to the function controllers 168 via the CPS 180. Although not shown, separate data bus connections are preferably established between respective elements of FIG. 7 to accommodate data transfers therebetween. As will be appreciated, other configurations can readily be utilized as desired.

FIG. 7 further shows a PCI interface (I/F) module 182 which establishes and directs transactions between the policy processor 156 and the ISP 150. An E-BUS I/F module 184 facilitates communications over the E-BUS 151 between FCCs 168 and list managers 170 of the respective ISPs 150. The policy processors 156 can also initiate and receive communications with other parts of the system via the E-BUS 151 as desired.

The controller architecture of FIGS. 6 and 7 advantageously provides scalable, highly functional data management and control for the array. Preferably, stripe buffer lists (SBLs) and other metadata structures are aligned to stripe boundaries on the storage media and reference data buffers in cache that are dedicated to storing the data associated with a disk stripe during a storage transaction. To enhance processing efficiency and management, data may be mirrored to multiple cache locations within the controller architecture during various data write operations with the array.

Figure 8:
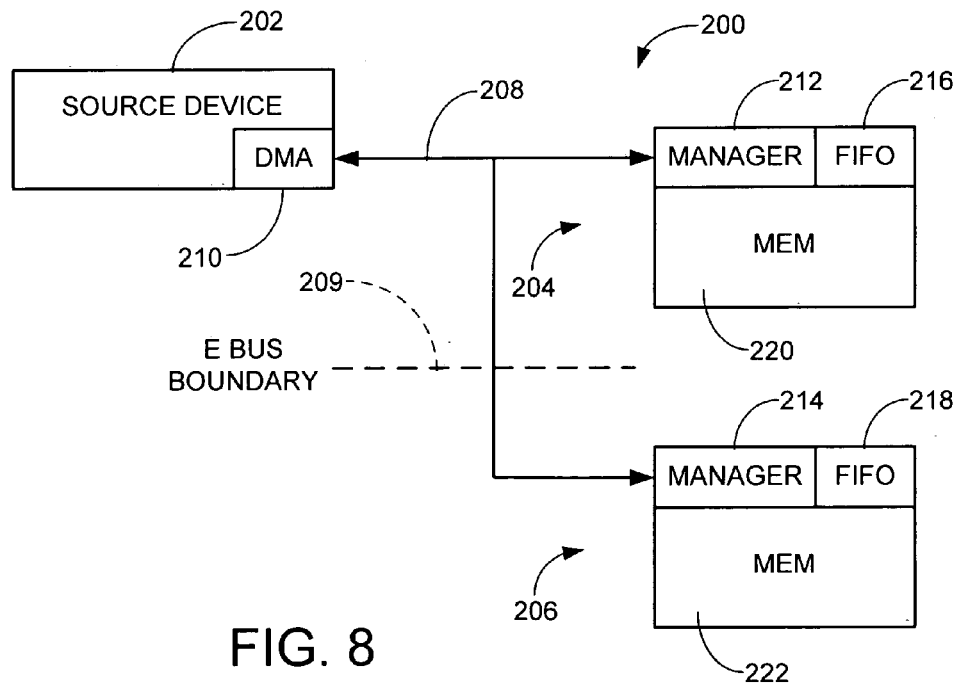
FIG. 8 sets forth a generalized representation of a source device connected to a number of parallel target devices.

Accordingly, FIG. 8 shows a generalized, exemplary data transfer circuit 200 to set forth preferred embodiments of the present invention in which data are passively mirrored to multiple target devices. The circuit 200 preferably represents selected components of FIGS. 6 and 7, such as a selected FCC 168 in combination with respective address generators of the respective ISPs 150. More specifically, the source device 202 is contemplated as comprising an FCC interface block and the target devices 204, 206 are contemplated as comprising respective buffer managers 212, 214 of the ISPs 150. However, this is merely for purposes of illustration and is not limiting.

The source device 202 preferably communicates with first and second target devices 204, 206 via a common pathway 208, such as a multi-line data bus. The pathway in FIG. 8 is shown to extend across an E-Bus boundary 209, although such is not necessarily required. The source device 202 preferably includes bi-directional (transmit and receive) direct memory access (DMA) block 210, which respectively interfaces with manager blocks 212, 214 of the target devices 204, 206.

The source device 202 is preferably configured to concurrently transfer a data, such as a data packet, to the first and second target devices 204, 206 over the pathway 208. Preferably, the data packet is concurrently received by respective FIFOs 216, 218 for subsequent movement to memory spaces 220, 222, which in the present example preferably represent different cache memory locations within the controller architecture.

In response to receipt of the transferred packet, the target devices 204, 206 each preferably transmit separate acknowledgement (ACK) signals to the source device 202 to confirm successful completion of the data transfer operation. The ACK signals can be supplied at the completion of the transfer or at convenient boundaries thereof.

Figure 9:
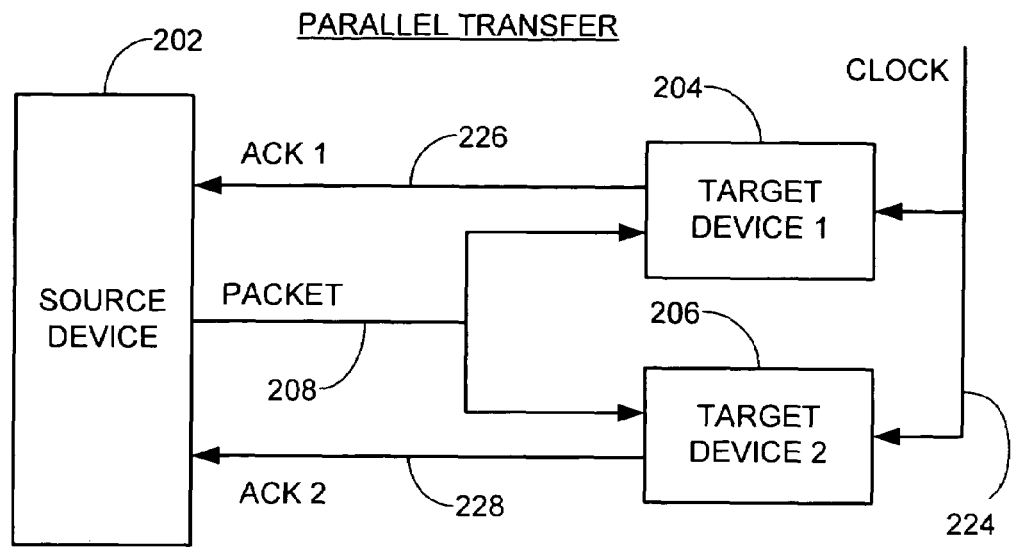
FIG. 9 illustrates a parallel concurrent transfer of data to target devices in accordance with a preferred embodiment.

In a first preferred embodiment, the concurrent transfer takes place in parallel as shown by FIG. 9. That is, the packet is synchronously clocked to each of the FIFOs 216, 218 using a common clock signal such as represented via path 224. In this way, a single DMA transfer preferably effects transfer of the data to each of the respective devices. The rate of transfer is preferably established in relation to the transfer rate capabilities of the pathway 208, although other factors can influence the transfer rate as well depending on the requirements of a given environment.

Although not required, it is contemplated that such synchronous transfers are particularly suitable when the target devices 204, 206 are nominally identical (e.g., buffer managers 212, 214 in nominally identical chip sets such as the ISPs 150). However, transfers can take place to different types of target devices 204, 206 so long as the transfer rate can be accommodated by the slower of the two target devices 204, 206. Upon completion, each device 204, 206 supplies a separate acknowledgement (ACK1 and ACK 2) via separate communication paths 226, 228 as shown.

Figure 10:
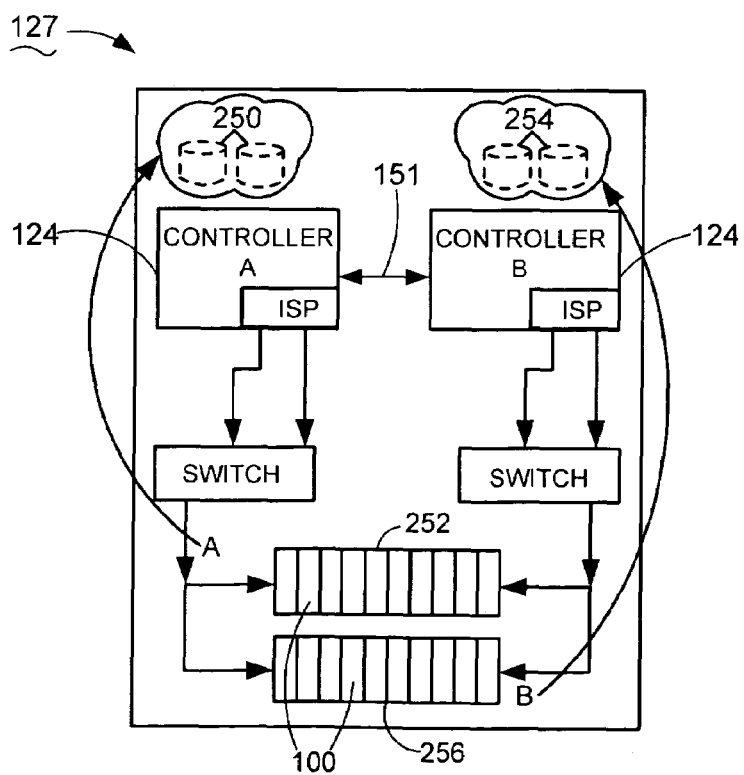
FIG. 10 is a depiction similar to FIG. 5.

The description now turns to how the present embodiments use passive mirroring to provide failsafe redundancy of stored cache data when operating in the dual active controller mode. The ISE 127 in FIG. 10 is addressable by a remote device in passing the I/O commands to each of the controllers 124A, 124B. In response to calls for storage capacity, a logical unit ("LUN") 250 is created from a storage pool related to the physical data pack 252 of data storage devices 100, and likewise a LUN 254 is created related to the physical data pack 256. Controller 124A is the unit master for LUN 250 and controller 124B the unit master for LUN 254. This affords advantageous load sharing benefits in that in the dual active mode of operation I/O commands associated with both LUNS 250, 254 can be processed in parallel.

The present embodiments contemplate a novel arrangement and manner of failing over from a dual active mode to a single active mode whereby only one of the two controllers 124 (the "survivor controller") temporarily becomes the unit master for both LUNS 250, 254 when the other controller (the "dead controller") becomes unavailable to the system 100. The present embodiments further contemplate a novel arrangement and manner of failing back to the dual active mode after the dead controller is rehabilitated and made fit for service again.

Figure 11:
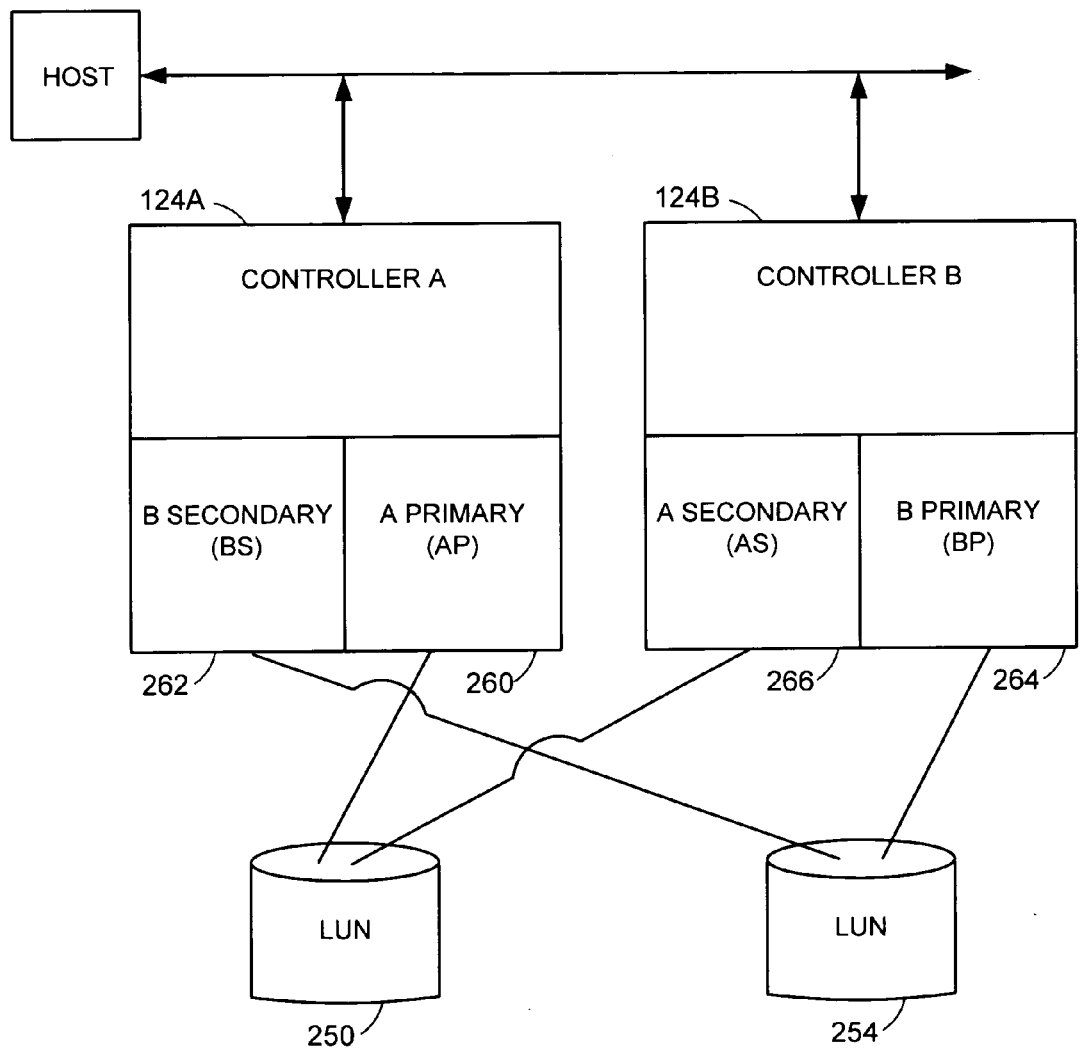
FIG. 11 is a different diagrammatic depiction of the intelligent storage element of FIG. 3.
Figure 12:
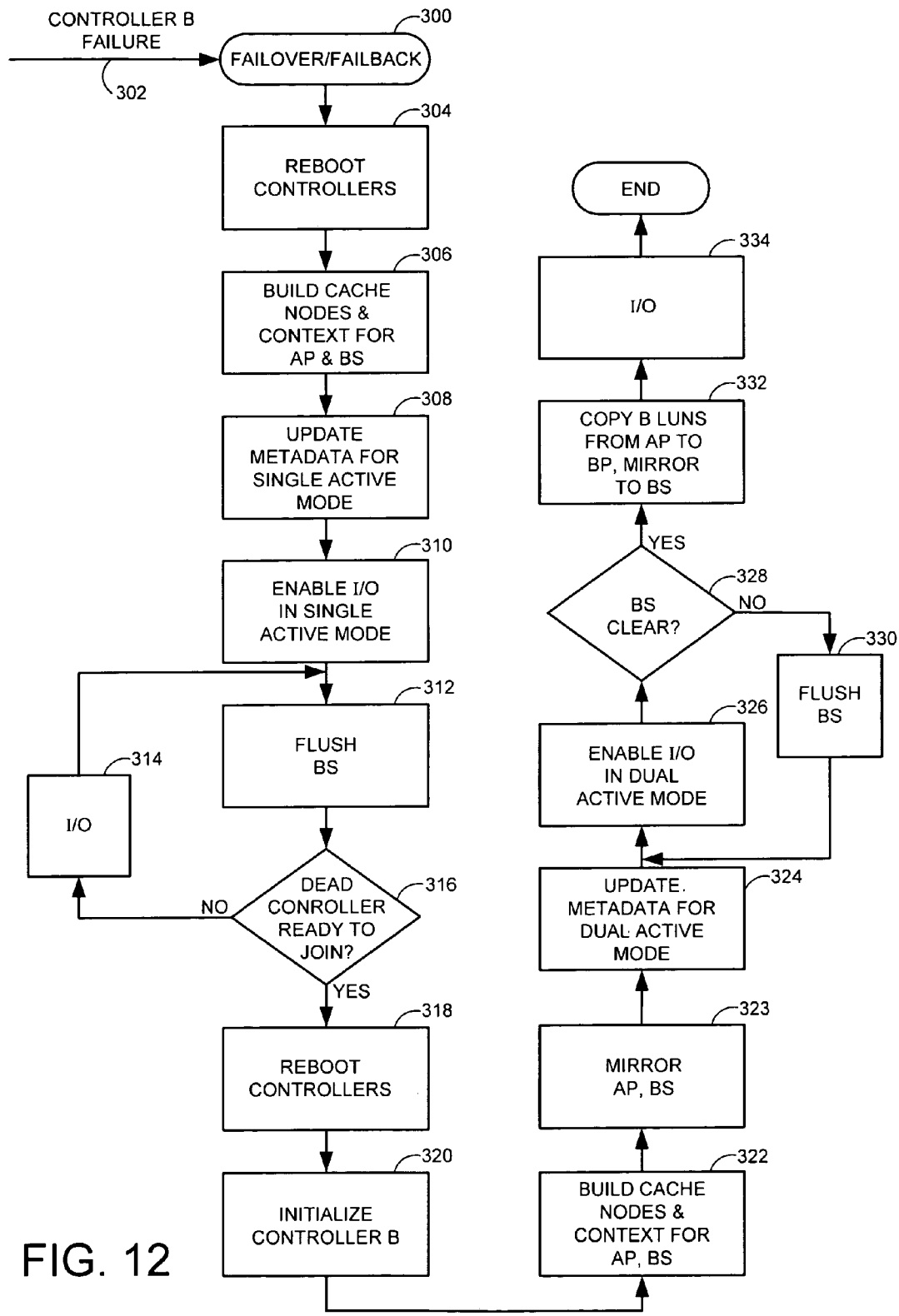
FIG. 12 shows a FAILOVER/FAILBACK routine, generally illustrative of steps carried out in accordance with preferred embodiments of the present invention.

The diagrammatic depiction of cache mirroring in FIG. 11 and the flowchart of FIG. 12 are now used to describe an apparatus and associated methodology contemplated by the present embodiments. The cache of controller 124A is partitioned into a primary cache 260 for receiving controller A data transfers to cache (sometimes referred to as "AP") and a secondary cache 262 for receiving mirror copies of controller B data transfers to cache (sometimes referred to as "BS"). Similarly, the cache of controller 124B is partitioned into a primary cache 264 for receiving controller B data transfers to cache (sometimes referred to as "BP") and a secondary cache 266 for receiving mirror copies of controller A data transfers to cache (sometimes referred to as "AS"). As described below, the present embodiments contemplate written instructions stored in memory enabling the ISP 150 to execute steps for failing back to a dual active mode by directly copying data stored in the survivor controller cache to the formerly dead controller cache.

In a dual active mode of operation, the unit master controller will, in response to host access commands, write back cache data to its own primary cache and mirror the data to the other controller's secondary cache. Even in the event of the non-unit master receiving a host access command, that command is passed to the unit master over the E-bus 151. More particularly, when controller 124B executes a write command then write back data is stored in BP 264 and is mirrored in BS 262 of controller 124A. If controller 124B fails, then a full record of cached data for both LUNS 250, 254 is available in the AP 260 and BS 262 cache of controller 124A. The steps of the flowchart of FIG. 12 will be used to describe a method for failing over and then failing back in accordance with the present embodiments.

The method 300 for failover/failback is invoked upon an indication 302 that one of the controllers 124 has become unavailable while operating in a dual active mode. For the sake of illustration the controller 124B has failed in the flowchart of FIG. 12. The method 300 begins by re-booting the controllers 124 in block 304 to map all LUNS 250, 254 to the remote device via the host port associated with controller 124A, and to disable the host port associated with controller 124B so that no data access commands will be received via controller 124B. The survivor controller 124A is hot booted quickly, while the dead controller 124B is cold booted and managed reliability diagnostics are initiated. In block 306 controller 124A constructs cache nodes and context for transactions only with AP 260 and BS 262. In block 308 metadata is updated to reflect that all write back cache data exists only in AP 260 and BS 262.

I/O commands are then enabled in block 310 for all LUNS 250, 254 in the single active controller mode. It will be noted that in the single active controller mode mirroring of the cache transfers ceases. It will also be noted that in the single active mode no new data is written to BS 262, firstly because no mirroring is being performed and secondly because new write back data for commands associated with LUN 254 are stored in AP 260. Flushing the BS 262 begins in block 312. Simultaneously, the I/O processing continues in block 314 so long as it is determined in block 316 that the dead controller 124B has not yet signaled a readiness to rejoin.

The dead controller 124B performs appropriate diagnostics and implements appropriate corrective measures in order to rehabilitate from the error condition necessitating its removal. When successfully rehabilitated, it will signal a readiness to join, thereby passing control to block 318 whereby both controllers 124 are hot booted in order to map all LUNS 250, 254 to the remote device via the respective unit manager host port in the dual active mode. In block 320 the formerly dead controller 124B is initialized in order to clear both BP 264 and AS 266. In block 322 cache nodes and context are constructed for unwritten data in AP 260 and BS 262. In block 323 the unwritten data in AP 260 and BS 262 are mirrored to BP 264 and AS 266. In block 324 metadata is updated to reflect that write back cache data exists in all quadrants AP 260, BP 264, AS 266, and BS 262.

In block 326 I/O commands are enabled for all LUNS 250, 254 via the dual active mode. Block 328 then determines whether BS 262 has been cleared as a result of the flushing instigated previously in block 312. If no, then flushing continues in block 330. However, if the determination of block 328 is yes then control passes to block 332 where all data in AP 260 that is associated with LUN 254 is copied to BP 264 and mirrored to BS 262. It will be noted that the direct copying of unwritten cache data in this manner is a quicker way of returning the system 100 to the dual active mode than an approach of flushing cache data in AP 260 but associated with LUN 254. Finally, I/O command processing continues in block 334 in the dual active controller mode.

Summarizing generally, a data storage system (such as 100) has a pair of controllers (such as 124A, 124B) and circuitry configured for failing back from a single active write back mode to a dual active write back mode by copying cached data directly from a cache of a survivor controller of the pair of controllers to a cache of the other controller. Preferably, the data copied from the survivor controller was previously mirrored via write back caching by the other controller in a dual active mode of the controllers. The circuitry can include computer instructions stored in memory and executed by a processor (such as 150) to carry out steps for failing back.

In other embodiments a method (such as 300) is provided for failing over from a dual active mode of first and second controllers to a single active mode of the first controller by relying on previously mirrored cache data by the second controller. The method further provides for reinitializing the controllers and then for failing back to the dual active mode by copying cached data directly from the first controller to the second controller.

The failing over step can be characterized by the controllers each having a cache partitioned into a primary cache (such as 260, 264) and a secondary cache (such as 262, 266), wherein prior to the failing over step in the dual active mode data that is write back cached by the second controller in its primary cache is mirrored in the first controller secondary cache. The failing over step can also be characterized by constructing cache nodes and context for data stored in the first controller cache (such as 306). The failing over step can also be characterized by disabling communication between the second controller and a remote device sending write commands (such as 304). The failing over step can also be characterized by updating metadata to associate all LUNS only with the first controller (such as 308). The failing over step can also be characterized in that the second controller formerly mastered at least one of the LUNS in the dual active mode.

In the failed over single active mode write back caching is performed to data associated with all LUNS via the first controller cache, and without cache mirroring. Flushing the first controller secondary cache is preferably performed until it is empty.

The reinitializing step can be characterized by clearing the second controller cache and enabling communication between the second controller and the remote device sending write commands (such as 318).

The failing back step can be characterized by the first controller receiving a ready to join signal from the second controller (such as 316). The failing back step can also be characterized by constructing cache nodes and context for unwritten data stored in the first controller, then by mirroring the unwritten data in the first controller to the second controller, and then by updating metadata to associate all LUNS with the first and second controllers (such as 322, 323, 324).

The failing back step can copy data in the first controller primary cache to the second controller primary cache (such as 332), the copied data being associated with LUNS that are mastered by the second controller in the dual active mode. Write caching commands can then continue via the first and second controller primary caches with cache mirroring re-established (such as 334).

In some embodiments a data storage system is provided with first and second controllers having respective write back caches for passing write commands to a storage space, and means for failing over and failing back to operate the controllers in single active and dual active modes, respectively.

For purposes of the present description and the appended claims the phrase "means for failing over and failing back" contemplates the described structure whereby unwritten cache data in the survivor cache, but that is associated with the dead controller, is copied directly to the reinitialized dead controller's cache. This is in contravention to other attempted solutions not contemplated herein that perform flushes on the unwritten data in the survivor controller's cache.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular processing environment without departing from the spirit and scope of the present invention.

In addition, although the embodiments described herein are directed to a data storage array, it will be appreciated by those skilled in the art that the claimed subject matter is not so limited and various other processing systems can be utilized without departing from the spirit and scope of the claimed invention.

What is claimed is:

1. A data storage system comprising a pair of controllers processing input/output commands directed to a storage space and circuitry configured for failing back from a failure of one of the controllers by copying cached data directly from a cache of a survivor controller of the pair of controllers to a cache of the other controller without the survivor controller flushing copied cached data with respect to the storage space, at a time before the controllers resume processing input/output commands in a dual active mode.

2. The data storage system of claim 1 wherein the copied cached data was previously mirrored via write back caching by the other controller in a dual active mode of the controllers.

3. The data storage system of claim 2 comprising computer instructions stored in memory and executed by a processor of the circuitry to carry out steps for failing back.

4. A method for processing input/output commands with respect to a storage space comprising:
   failing over from a dual active mode of first and second controllers to a single active mode of the first controller by relying on previously mirrored cache data from the second controller;
   reinitializing the second controller; and
   failing back to the dual active mode by copying cached data directly from the first controller to the second controller without the first controller flushing copied cached data with respect to the storage space, at a time before the controllers resume processing the input/output commands in a dual active mode.

5. The method of claim 4 wherein the failing over step is characterized by the controllers each having a cache partitioned into a primary cache and a secondary cache, wherein prior to the failing over step in the dual active mode data that is write back cached by the second controller in its primary cache is mirrored in the first controller secondary cache.

6. The method of claim 5 wherein the failing over step is characterized by constructing cache nodes and context for data stored in the first controller cache.

7. The method of claim 6 wherein the failing over step is characterized by disabling communication between the second controller and a remote device sending write commands.

8. The method of claim 7 wherein the failing over step is characterized by updating metadata to associate all LUNS only with the first controller.

9. The method of claim 8 wherein the failing over step is characterized in that the second controller formerly mastered at least one of the LUNS while in the dual active mode.

10. The method of claim 9 wherein the failing over step is characterized by write back caching data to all LUNS via the first controller cache.

11. The method of claim 10 wherein the failing over step is characterized by write caching commands only via the first controller primary cache without cache mirroring.

12. The method of claim 11 wherein the failing over step is characterized by flushing the first controller secondary cache until it is empty.

13. The method of claim 12 wherein the reinitializing step is characterized by clearing the second controller cache.

14. The method of claim 13 wherein the reinitializing step is characterized by enabling communication between the second controller and the remote device sending write commands.

15. The method of claim 14 wherein the failing back step is characterized by the first controller receiving a ready to join signal from the second controller.

16. The method of claim 15 wherein the failing back step is characterized by constructing cache nodes and context for data stored in the first and second controllers and mirroring the stored data to the second controller.

17. The method of claim 16 wherein the failing back step is characterized by updating metadata to associate all LUNS with the first and second controllers.

18. The method of claim 17 wherein the failing back step is characterized by copying data in the first controller primary cache directly to the second controller primary cache, wherein the copied data is associated with LUNS that are mastered by the second controller in the dual active mode.

19. The method of claim 18 wherein the failing back step is characterized by write back caching via the first and second controller primary caches with cache mirroring.

* * * * *